United States Patent
Ignarra et al.

(10) Patent No.: US 10,647,279 B1
(45) Date of Patent: May 12, 2020

(54) MOUNTING BRACKET FOR MOUNTING FOG LIGHT ON AUTOMOBILE BUMPER

(71) Applicants: Warner Science Applications Corp., Ontario, CA (US); Paramount Automotive Restyling Inc., Ontario, CA (US)

(72) Inventors: Ricardo S. Ignarra, La Habra Heights, CA (US); Mingfa Yang, Calabasas, CA (US)

(73) Assignees: Warner Science Applications Corp., Ontario, CA (US); Paramount Automotive Restyling Inc., Ontario, CA (US)

(*) Notice: Subject to any disclaimer, the term of this patent is extended or adjusted under 35 U.S.C. 154(b) by 0 days.

(21) Appl. No.: 16/200,473

(22) Filed: Nov. 26, 2018

(51) Int. Cl.
  *B60R 19/50* (2006.01)
  *B60Q 1/20* (2006.01)
(52) U.S. Cl.
  CPC ............... *B60R 19/50* (2013.01); *B60Q 1/20* (2013.01); *B60R 2019/505* (2013.01)
(58) Field of Classification Search
  CPC ..... B60R 2019/505; B60R 19/50; B60Q 1/18; B60Q 1/20
  See application file for complete search history.

(56) References Cited

U.S. PATENT DOCUMENTS

| 3,794,278 | A | * | 2/1974 | Frey, Jr. ................... | F16L 5/00 |
| | | | | | 248/27.3 |
| 10,166,941 | B1 | * | 1/2019 | Yang ....................... | B60R 19/50 |
| 2016/0264040 | A1 | * | 9/2016 | Kai ....................... | B60Q 1/0483 |
| 2017/0043706 | A1 | * | 2/2017 | Shibata ................... | F21S 41/00 |
| 2017/0350567 | A1 | * | 12/2017 | Shibata ................... | F21S 41/00 |

FOREIGN PATENT DOCUMENTS

| CN | 203920556 U | * | 11/2014 | |
| CN | 204172831 U | * | 2/2015 | |
| DE | 102013107219 A1 | * | 1/2015 | .......... B60Q 1/0052 |
| WO | WO-2017055781 A1 | * | 4/2017 | .......... B60Q 1/2638 |

OTHER PUBLICATIONS https://www.amazon.com/EAG-Mounting-Bracket-2018-2019-Wrangler/dp/B07JJ29W8J/ref=pd_ybh_a_1?_encoding=UTF8&psc=1&refRID=RV9NYS9DG073AD5AG6BW (Year: 2018).*

* cited by examiner

*Primary Examiner* — Alexander K Garlen
(74) *Attorney, Agent, or Firm* — Chen Yoshimura LLP

(57) ABSTRACT

A mounting bracket for mounting a fog light on an automobile bumper includes a base plate having a center opening. A support frame is joined to and extending away from the base plate and around a portion of the opening, and a bottom plate is joined to another end of the support frame. The fog light is installed in the bracket through the center opening, so that an angle adjustment thumbwheel of the light is located in the space created by the support frame and bottom plate. The bracket with the light is then mounted to the bumper. A gap in the support frame allows the user to access and turn the thumbwheel after the light is mounted to the bumper. The bracket serves as a relocation bracket that allows factory fog lights for newer Jeep Wrangler model to fit into an aftermarket bumper designed for earlier Jeep Wranglers.

7 Claims, 5 Drawing Sheets

MOUNTING BRACKET FOR MOUNTING FOG LIGHT ON AUTOMOBILE BUMPER

BACKGROUND OF THE INVENTION

This invention relates to automobile parts, and in particular, it relates to a mounting bracket for mounting a light, such as a fog light, onto an automobile bumper.

SUMMARY

The mounting bracket described herein is for mounting a light, such as a fog light, on the bumper of an automobile such as cars or trucks. More specifically, an embodiment of the present invention provides a mounting bracket that allows different factory fog lights to fit into a bumper, typically an aftermarket bumper.

One embodiment of the present invention provides a mounting bracket adapted for mounting a light on a bumper of an automobile. The mounting bracket includes: a base plate having an opening, the opening having a first portion that is a part of a circle, and a second portion joined to the first portion; a support frame joined at one end to the based plate, the support frame extending away from the base plate and extending around the second portion of the opening of the base plate; and a bottom plate joined to another end of the support frame and spaced apart from the base plate, the bottom plate overlapping with the second portion of the opening when viewed in a direction perpendicular to the opening. The base plate further has a first plurality of through holes located at corners or along edges of the base plate, and the bottom plate also has a through hole.

It is to be understood that both the foregoing general description and the following detailed description are exemplary and explanatory and are intended to provide further explanation of the invention as claimed.

DETAILED DESCRIPTION OF PREFERRED EMBODIMENTS

Many automobiles are equipped with fog lights mounted on the factory bumper. For automobiles of different makes, models or model years, the fog light's shape or size, structure, mounting structures, and mounting points may be different. Sometimes, automobile owners install aftermarket bumpers that have different shapes than the factory bumpers for aesthetics, style or other reasons. Embodiments of the present invention provide a mounting bracket which can be used in cooperation with an aftermarket bumper to accommodate original factory fog lights used in different models (including model years) of automobiles. It allows the customer to install factory fog lights on the aftermarket bumper even when the fog lights are for different models and have different shapes. In one particular embodiment, the mounting bracket serves as a relocation bracket that allows the factory fog lights for the Jeep Wrangler 2018 and later models to fit into an aftermarket bumper that is designed for earlier Jeep Wranglers (2007-2017).

Figure 1:
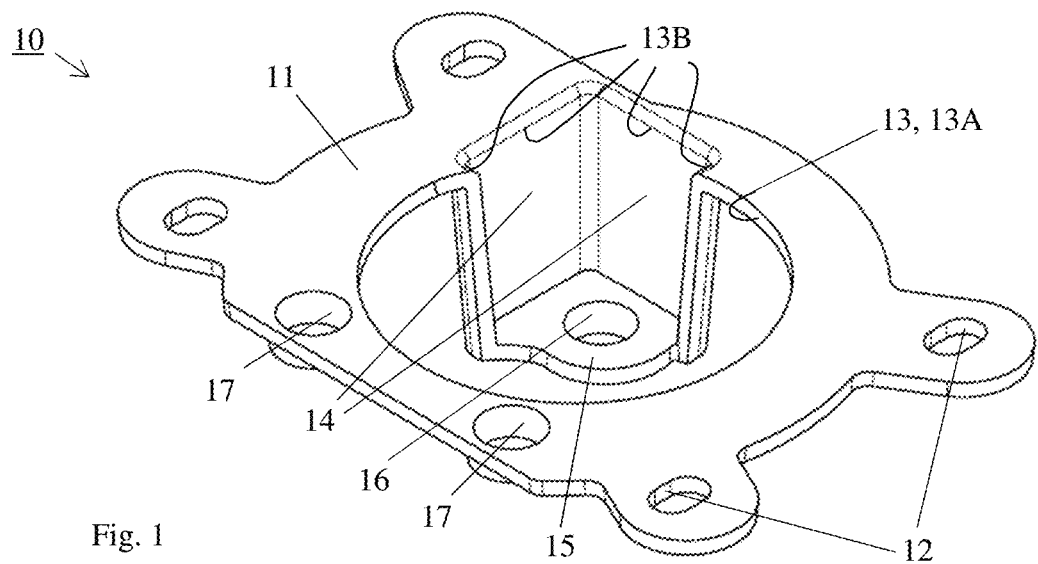
FIG. 1 is a top, front, and right side perspective view of a mounting bracket for mounting a light on an automobile bumper according to an embodiment of the present invention.
Figure 2:
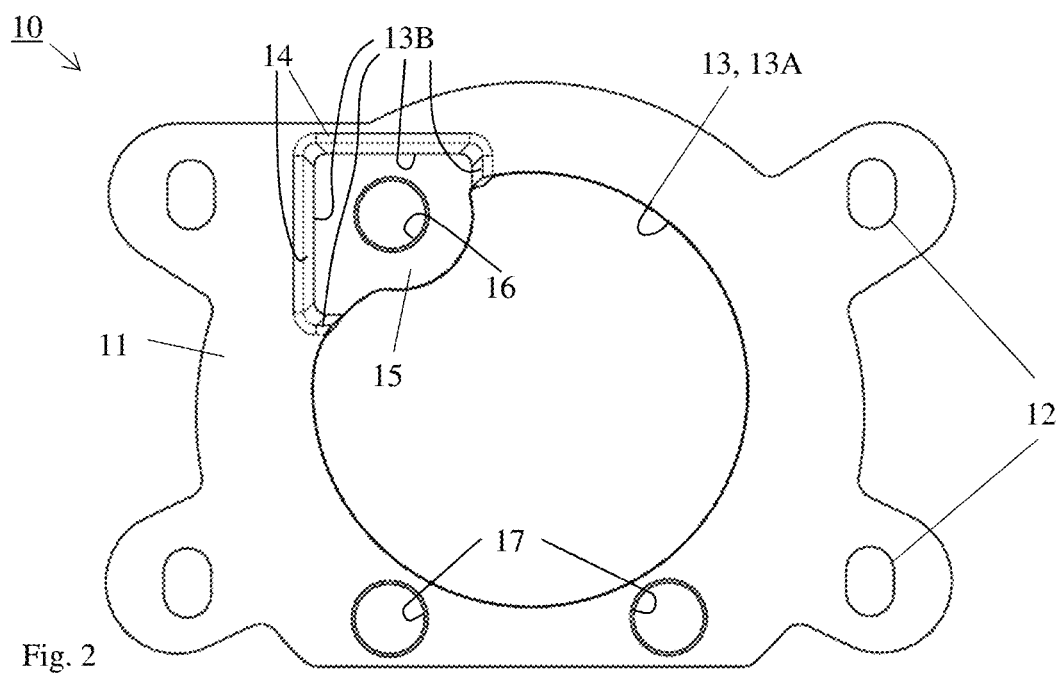
FIG. 2 is a top view of the mounting bracket.
Figure 3:
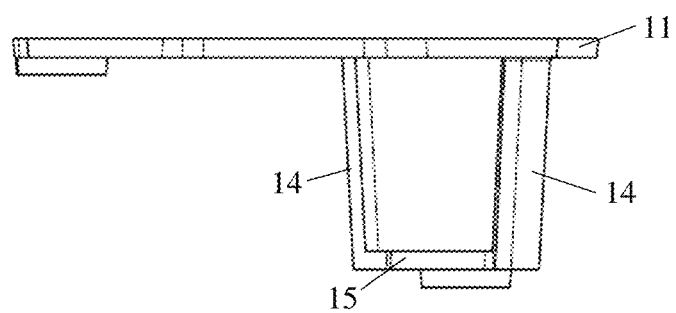
FIG. 3 is a right side view of the mounting bracket.

As shown in FIG. 1 (top, front, and right side perspective view), FIG. 2 (top view), FIG. 3 (right side view), the mounting bracket 10 has a plate shaped base (base plate) 11 with multiple (e.g. 4) through holes 12 formed at its corners or along its edges. The through holes 12, which may have a slightly elongated shape, are adapted for securing the bracket 10 to the bumper. The base plate 11 may be a flat plate or a curved plate that conforms to the interior shape of the bumper where the bracket is mounted.

The base plate 11 has a center opening 13 located near its center. The outline of the center opening 13 has a round first portion 13A which is a part of a circle, and second portion 13B joined to the round first portion. In the illustrated embodiment, the second opening portion 13B has the shape of a square with a truncated corner, but other shapes are also possible, such as a part of a another circle. Preferably, the first portion occupies more than 270 degrees of the complete circle. More preferably, the first portion occupies about 300 degrees of the complete circle. The first portion 13A and a second portion 13B together form a continuous outline of the center opening 13.

A vertical support frame 14 is joined to and extends downwardly from the base plate 11, and extends laterally around the edge of the second portion 13B of the opening 13. In other words, in the top view, the support frame 14 extends along the outline of the second portion 13B of the opening 13. The support frame 14 does not form a complete enclosure in the top view; rather, there is a gap in the support frame that faces the center of the center opening 13. A bottom plate 15 is joined to the lower end of the vertical support frame 14, so that it is spaced apart from the base plate 11 and disposed substantially parallel to the base plate. When viewed from the top (FIG. 2), the location of the bottom plate 15 coincides with the second opening portion 13B; the bottom plate may be slightly larger or slightly smaller than the second opening portion. Except for the bottom plate 15, the space below the center opening 13 is free of any other structure.

In the illustrated embodiment, the vertical support 14 is a solid wall. Alternatively (not shown), it may be a wall with slots, or it may be formed of a plurality of vertical poses joined to the base plate 11 and the bottom plate 15.

A through hole 16 is formed in the bottom plate 15. Two additional through holes 17 are formed on the base plate 11 adjacent to the center opening 13. These through holes are adapted for mounting the fog light to the mounting bracket 10. A flange may be provided on the bottom side of the base plate 11 around each through hole 16 and 17, to act as a washer.

The mounting bracket 10 may be formed of a plastic material by molding, or formed of a metal, or other suitable materials.

Figure 4:
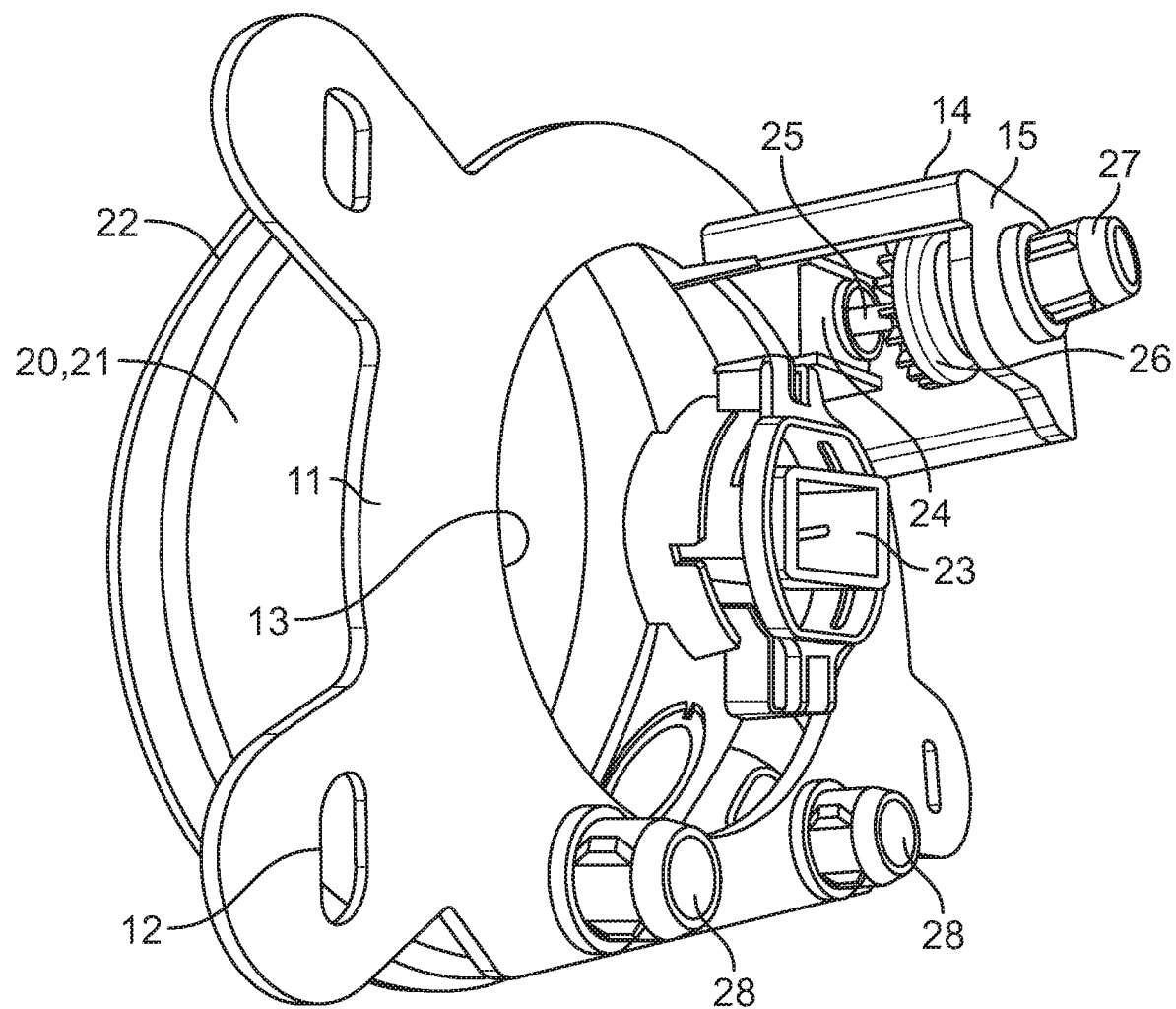
FIG. 4 illustrates the mounting bracket with a light installed therein.
Figure 5:
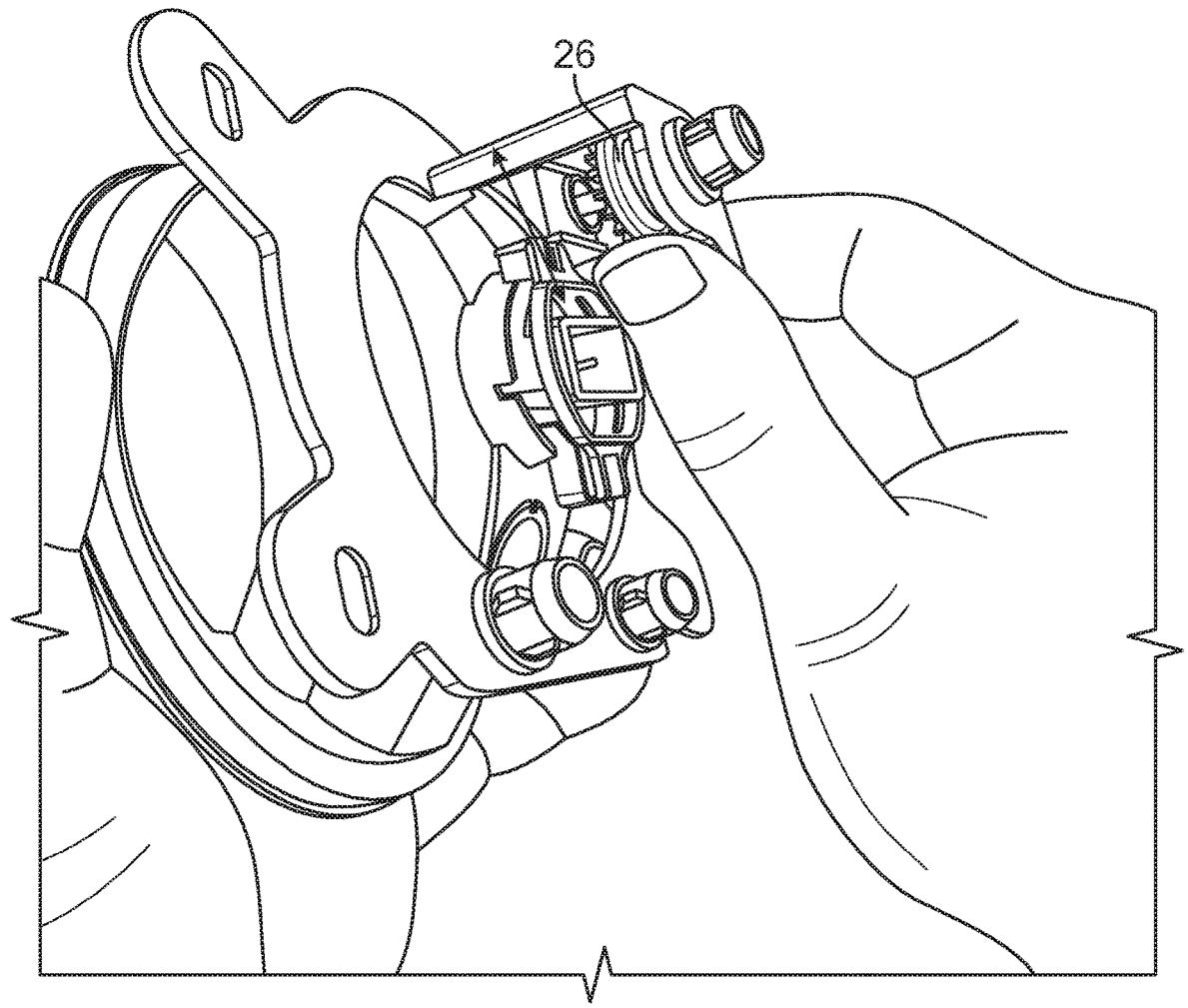
FIG. 5 illustrates adjustment of the light installed in the mounting bracket.
Figure 6:
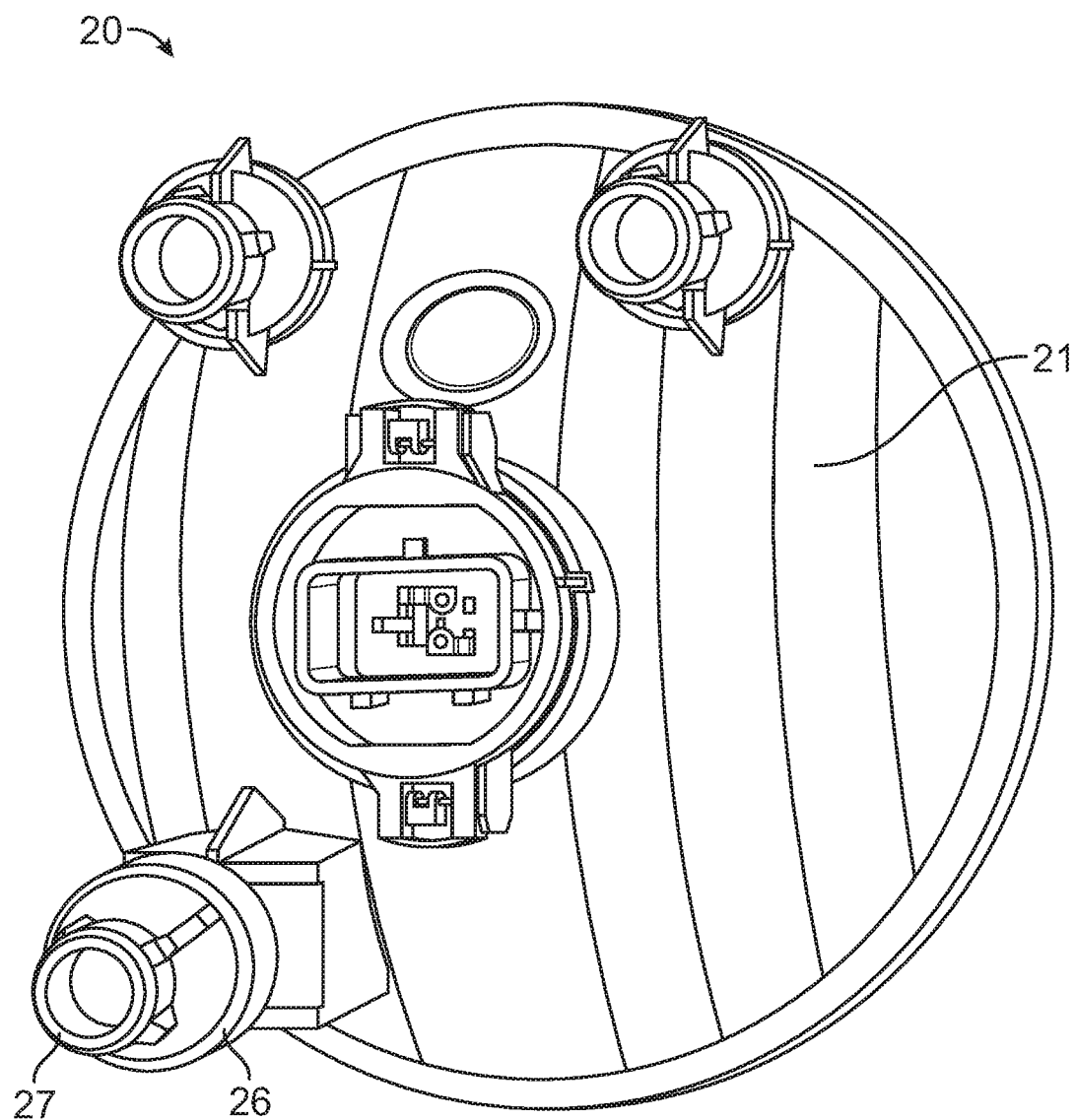
FIG. 6 shows the light before mounting.

FIG. 4 illustrates a fog light 20 mounted to the mounting bracket 10. An unmounted fog light is shown in FIG. 6. The fog light 20 has a generally cone or dome shaped body 21 with a front face 22 from which light is emitted. An electrical connector 23 is provided on the body, for example, at the back end of the body. The fog light 20 also has a protruding portion 24 which protrudes backwardly from the body 21, and a rotating shaft 25 extending out of the protruding portion 24 toward the back with a thumbwheel 26 joined to the shaft. The shaft 25 is mechanically coupled to an adjustment component (not shown) disposed inside the protruding portion 24 and the body 21; by turning the thumbwheel 26 and therefore the shaft 25, the direction of the light emitted from the front face 22, relative to the normal direction of the front face, can be finely adjusted.

When mounted on the mounting bracket 10, the front face 22 of the fog light 20 is substantially parallel to the base plate 11, a part of the body 21 passes through the center opening 13 of the mounting bracket, and a part of the protruding portion 24, the shaft 25 and the thumbwheel 26 are disposed in the space defined by the vertical support frame 14 and the bottom plate 15. A part of the thumbwheel 26 is exposed through the gap of the support frame 14, allowing a user to turn the thumbwheel 26 to adjust the direction of the emitted light.

The fog light 20 can be mounted to the mounting bracket 10 by a number of fasteners, such as bolts and nuts 27 and 28, through the through holes 16 and 17 of the mounting bracket. In the illustrated embodiment, the rotating shaft 25 extends through the through hole 16 of the bottom plate 15 and is secured with a nut 27. This provides support for the rotating shaft 25 as the thumbwheel 26 is turned.

It is noted that the through holes 12 are located at sufficient distances from the opening 13 such that they are clear of the fog light body 21 when viewed in the longitudinal direction of the light body.

Figure 7:
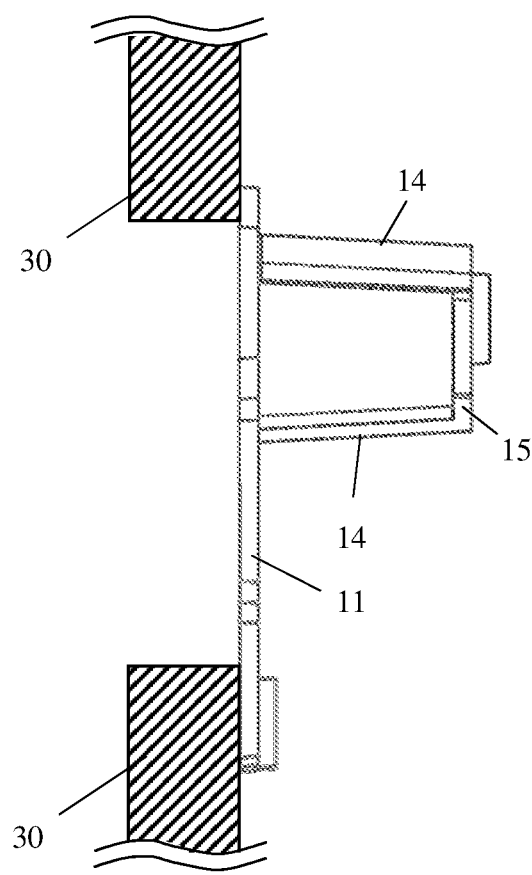
FIG. 7 schematically illustrates a right side view of the mounting bracket mounted on a bumper.

Also note that in the orientations of FIGS. 1-3, the base plate 11 is at the top of the mounting bracket 10; when the mounting bracket and the light is installed on the bumper (see FIG. 7, showing bumper 30, the gap being the opening in the bumper for the light), the base plate is nearly vertical and faces forward of the automobile.

To install the fog light 20 on the bumper, the user first secure the light to the mounting bracket 10 using the fasteners via the through holes 16 and 17, then secure the mounting bracket to the bumper using additional fasteners such as screws, nuts and bolts, etc. via the through holes 12. The front face 22 of the light 20 is exposed through a fog light opening of the bumper. The user than reaches under the bumper and turns the thumbwheel 26 to finely adjust the direction of the emitted light.

It will be apparent to those skilled in the art that various modification and variations can be made in the light housing method of the present invention without departing from the spirit or scope of the invention. Thus, it is intended that the present invention cover modifications and variations that come within the scope of the appended claims and their equivalents.

What is claimed is:

1. A light housing adapted to be installed on a bumper of an automobile, comprising:
   a base plate defining an opening, the opening having a outline lying in a plane, the outline having a first portion that is a part of a circle, and a second portion joined to the first portion, the second portion being different from any part of the circle;
   a support frame joined at one end to the base plate, the support frame extending away from the base plate and extending around the second portion of the outline of the opening of the base plate; and
   a bottom plate joined to another end of the support frame and spaced apart from the base plate, the bottom plate overlapping with the second portion of the outline of the opening when viewed in a direction perpendicular to the opening.

2. The light housing of claim 1, wherein the base plate further defines a first plurality of through holes located at corners or along edges of the base plate.

3. The light housing of claim 1, wherein the bottom plate defines a through hole.

4. The light housing of claim 1, wherein the support frame is a solid wall.

5. The light housing of claim 1, wherein the base plate is a flat plate.

6. The light housing of claim 5, wherein the bottom plate is a flat plate and is parallel to the base plate.

7. The light housing of claim 1, wherein the first portion includes more than 270 degrees of the circle.

* * * * *